April 3, 1951  J. R. BELKNAP  2,547,555
JOURNAL BEARING
Filed Nov. 5, 1948  2 Sheets-Sheet 1

Inventor
Joel R. Belknap
By Dodge and Ion
Attorneys

Patented Apr. 3, 1951

2,547,555

UNITED STATES PATENT OFFICE 2,547,555

JOURNAL BEARING

Joel R. Belknap, South Charleston, W. Va.

Application November 5, 1948, Serial No. 58,479

3 Claims. (Cl. 308—79)

This invention relates to lubrication of journal bearings and particularly to means serving to accumulate a charge of oil adjacent the bearing as an incident to the turning of the journal in the bearing; retain this charge when the rotation ceases, and forcibly deliver oil from said charge to the journal as an incident to the commencement of rotation. The invention is particularly designed for use in a railway car journal box, and without excluding other possible fields of use the concept will be described as adapted to this use.

When a railway car stands idle, its weight will gradually squeeze the lubricant from between the journal and the bearing brass. Therefore, upon starting, the bearing surfaces are dry, so that excessive wear occurs until a film of lubricant is established. This wear is minimized by this invention because during the initial rotation of the journal, oil under pressure is forced between the journal and the brass.

The load supporting member of the bearing is so shaped, that the brass may rock relatively thereto. To accomplish this the sides of the load supporting member are spaced from the brass when the journal and brass are in their normal position. The chambers so formed are charged with oil. As an incident to the rocking of the brass the volumes of these chambers are changed, reversely to one another. The oil in the chamber whose volume is thus decreased is subjected to an increased pressure and is forced therefrom through ports in the brass to the surface of the journal. The pressure in the other chamber is decreased and oil is drawn from the reservoir into this chamber, thus assuring that this chamber will be charged with oil. When the parts resume their normal position, the chamber from which the oil had been dissipated draws oil from the reservoir thus recharging itself.

A preferred embodiment of my invention is shown in the accompanying drawing, in which Fig. 1 is a transverse section of the improved bearing.

Figure 3:
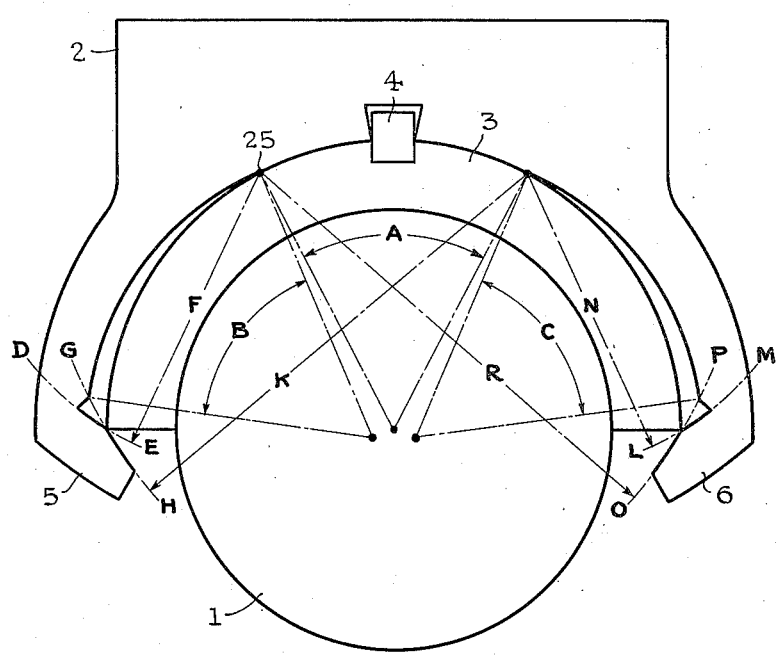
Fig. 3 is a view of the bearing as shown in Fig. 1 in diagrammatic form.

Interposed between the journal 1 and the load supporting member 2 is a bearing brass 3. The two engage on a cylindrical seat in which the inner diameter of the load supporting member is the same as the outer diameter of the bearing brass along an arc A, the length of the arc A being exaggerated in the drawing for the sake of clarity. The radii of the arcs B and C are equal and equal to the radius of the arc A, but the centers of arcs B and C are displaced to left and right respectively from the center of the arc A as shown in Fig. 3.

A key 4 fixed in the brass prevents the brass 3 from sliding in relation to the load supporting member 2 but permits it to rock. The lower edges of the load supporting member 2 extend inwardly forming lips 5 and 6. The inner faces of the lip 5 are machined so that surface DE is a cylindrical segment of radius F and the surface GH is a cylindrical segment of radius K. The faces of the lip 6 are machined so that the surface LM is a cylindrical segment of radius N and the surface OP is a cylindrical segment of radius R.

Flexible oil seals 7 and 8 are placed on the lower outer edges of the bearing brass. The load supporting member has recesses 10 to accommodate seals 7 and 8 when the brass rocks. The brass 3 is provided with drilled ports 9 and 11. Fitted into grooves 12 and 13 in the bearing brass 3 are arcuate sealing rings 14 and 15. Said rings fit into mating grooves 16 and 17 in the load supporting member 2, the grooves being deep enough to permit the rings 14 and 15 to move freely in a radial direction. An oil reservoir 18 which may or may not contain waste as well as oil is mounted beneath the bearing assembly.

Figure 1:
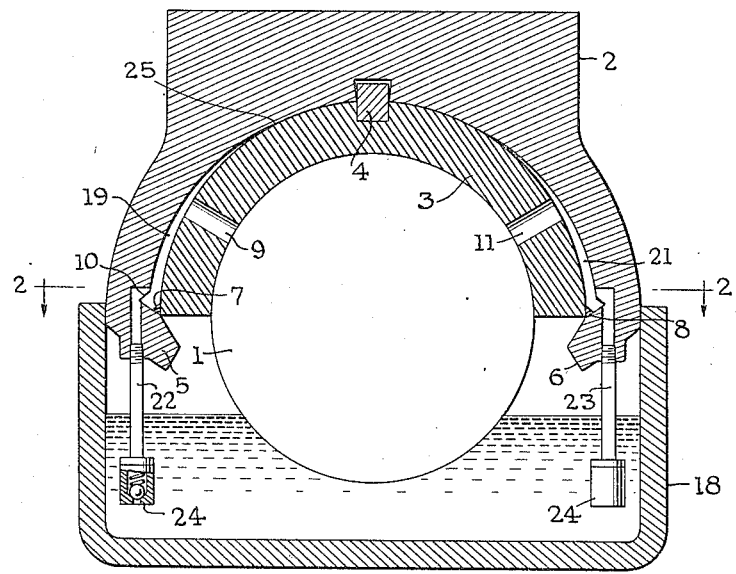
Figure 2:
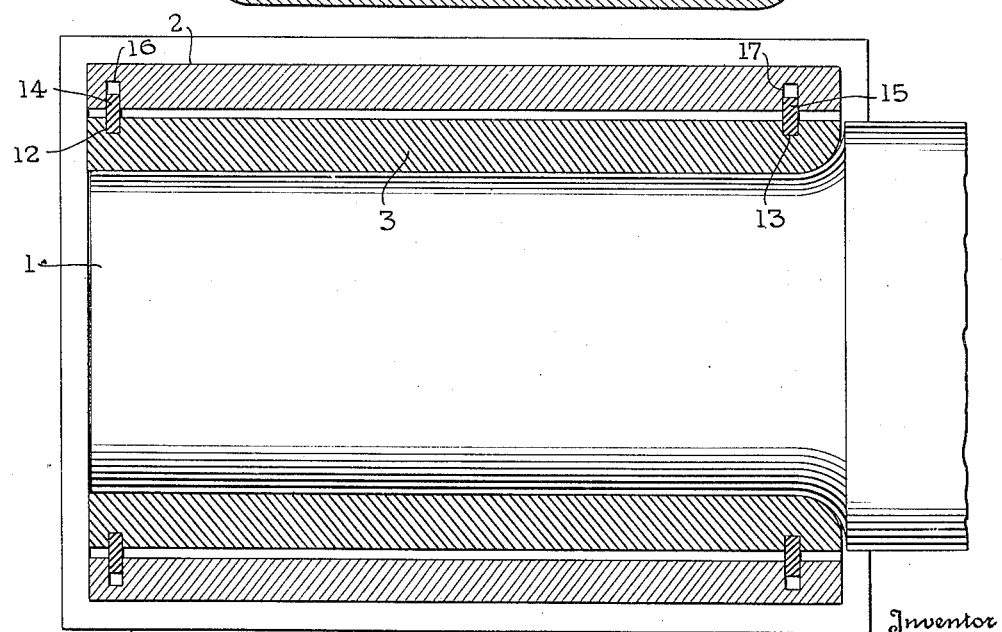
Fig. 2 is an axial section of the bearing, on the line 2—2 of Fig. 1.

Chambers 19 and 21 defined by the bearing brass 3 and the load supporting member 2 are connected to the reservoir 18 by means of flexible pipes 22 and 23, and these are each provided with an inward opening check valve 24 at their respective lower ends, as shown in Fig. 1. One of said check valves is drawn in section to show the internal construction.

The operation of the bearing will now be described. Upon initial assembly of the bearing chambers 19 and 21 are filled with oil. As the journal 1 starts to rotate in a clockwise direction as seen in Fig. 1, the friction between the journal 1 and the bearing brass 3 will cause the latter to rock relatively to the load supporting member 3 about the shoulder 25. This develops pressure on the oil contained in chamber 19, and will act to force oil therefrom through the port 9 to the journal surface. At the same time suction is developed in chamber 21 so that oil will flow up past the check valve 24 through pipe 23 into this space, thus assuring its being fully charged.

It will be seen that the bearing surfaces are supplied with lubricating oil as an incident to the commencement of journal rotation. As the lubricant causes a reduction in the frictional force existing between the journal 1 and the brass 3, the load on the load supporting member 3 will act to return the bearing to its normal position, at which time chamber 19 will be recharged through pipe 22. The lateral motion of the journal upon rocking of the brass 3 is limited so that the parts remain in a condition of stable equilibrium.

It is possible to construct the bearing without the pipes 22 and 23 to supplement the charging of spaces 19 and 21. A certain amount of oil will be picked up by the journal as it rotates, and will be forced under presure through ports 9 and 10 to chambers 19 and 21 respectively. However, in cases where the journal rotation is intermittent in character, it has been found advisable to furnish this supplemental charging means.

I claim:

1. The combination of a journal; a brass with respect to which said journal is rotatable, said brass being sustained by said journal and having a load-sustaining surface on its top and extensions at each side of said surface, said extensions being formed with ports leading through the brass to the journal-engaging face of the brass; a load-supporting member having a mid-portion which rests upon said load-sustaining surface and as to which the brass may rock, said member having extensions at each side of said mid-portion which diverge from the extensions of the brass, the extensions of the brass and of the load-sustaining member having marginal conjugate surfaces which seal with each other when the brass rocks relatively to the load-sustaining member; sealing means which together with said conjugate surfaces define closed spaces whose volume varies during such rocking motion and from which spaces said ports lead; means restricting the rocking motion of the brass to a limited range; an oil reservoir; and valved connections permitting one-way flow from the reservoir to each of said closed spaces.

2. The combination defined in claim 1 in which the load-sustaining surface on the journal and the mid-portion of the load-supporting member engage over a substantial area bounded by marginal lines parallel with the axis of the journal, whereby the rocking motion of the brass occurs about one or the other of said lines according as it is in one direction or the other from mid-position and the parts are in stable equilibrium under load when in said mid-position.

3. The combination defined in claim 1 in which the load-sustaining surface on the journal and the mid-portion of the load-supporting member engage over a substantial area bounded by marginal lines parallel with the axis of the journal whereby the rocking motion of the brass occurs about one or the other of said lines according as it is in one direction or the other from mid-position and said lines are so widely spaced, and the rocking motion is so limited that the load reaction on the brass is toward said mid-position in all positions of the brass.

JOEL R. BELKNAP.

REFERENCES CITED

The following references are of record in the file of this patent:

UNITED STATES PATENTS

| Number | Name | Date |
|---|---|---|
| 771,506 | Stiles | Oct. 4, 1904 |
| 809,635 | Schrader | Jan. 9, 1906 |
| 1,824,702 | Bird | Sept. 22, 1931 |